United States Patent [19]

Takeuchi

[11] Patent Number: 4,622,191
[45] Date of Patent: Nov. 11, 1986

[54] METHOD FOR MANUFACTURING DECORATIVE MOLDING

[75] Inventor: Shin Takeuchi, Aichi, Japan

[73] Assignee: Inoue Mtp Kabusiki Kaisha, Nagoya, Japan

[21] Appl. No.: 643,521

[22] Filed: Aug. 23, 1984

[30] Foreign Application Priority Data

Aug. 23, 1983 [JP] Japan ................... 58-153699

[51] Int. Cl.⁴ .................. B29C 61/02; B32B 31/26
[52] U.S. Cl. ................... 264/134; 264/132; 264/230; 264/246; 264/265; 264/266
[58] Field of Search ............... 264/134, 230, 265, 266, 264/DIG. 71, 132, 246

[56] References Cited

U.S. PATENT DOCUMENTS 3,262,451  7/1966  Morse ........................ 264/230 X
3,600,490  8/1971  Billingsley et al. .......... 264/316 X
3,962,009  6/1976  Minami et al. ............... 264/230 X

FOREIGN PATENT DOCUMENTS 56-67213  6/1981  Japan ......................... 264/134

Primary Examiner—Jan Silbaugh
Attorney, Agent, or Firm—Armstrong, Nikaido, Marmelstein & Kubovcik

[57] ABSTRACT

A method for manufacturing a decorative molding having an outer surface layer with a round peripheral edge, comprising preparing a desired shape of decorative base plate which has an outer decorative layer and a mounting surface of a plastic layer which shrinks when heated, pouring thermo-setting liquid plastic onto the outer surface of the decorative layer of the base plate to coat the outer surface with liquid plastic, and then heating the liquid plastic to cure the same and heating the plastic layer of the base plate so that a predetermined amount of shrinkage of the plastic layer takes place.

8 Claims, 5 Drawing Figures

METHOD FOR MANUFACTURING DECORATIVE MOLDING

BACKGROUND OF THE INVENTION

2. Field of the Invention

This invention relates to a method for manufacturing a decorative molding, more particularly a plastic-based decorative molding.

2. Description of the Prior Art

Plastic decorative moldings are conventinally used for decorating the edges of desks or tables or the like, or for decorating, protecting and/or covering projections provided on outer and inner surfaces of automobiles.

Conventional moldings having different lengths and the same cross sectional shape is usually used for multiple purposes multipurpose. Accordingly, moldings having different lengths are usually manufactured by a known plastic extrusion molding process in which elongated products having a uniform cross section can be continuously molded. The molded products obtained by the extrusion molding process are then cut at predetermined lengths, in accordance with the various uses of the decorative moldings. The cut ends of the decorative moldings must be, however, finished with special instruments, or must be subject to special surface treatments.

In order to eliminate the need for such a special finishing operation or surface treatments, it has been proposed to make a decorative molding from a plastic film on which metal, such as aluminum or aluminum foil, is vaporized. High consistency liquid plastic is fed onto the plastic film, so that the liquid plastic forms itself into a convex surface layer due to the interfacial force. The convex plastic is then cured, so that a plastic decorative molding having a convex profile can be obtained. In this way, the above mentioned finishing operation or special surface treatments can be dispensed with, since the ends of the products, i.e. the decorative moldings have round edges, due to the interfacial tention of the liquid plastic.

However, this alternative method raises another problem. When the liquid plastic is cured, the molding is entirely warped toward the side of the liquid plastic film, due to the mold shrinkage of the liquid plastic. In particular, an elongated product, such as a decorative molding causes a large shrinkage in the longitudinal direction, in proportion to the length, resulting in a large warpage at the opposite ends thereof. It goes without saying that a warpage occurs also in the direction of the width of the molding, but the warpage is negligibly small when the width is small, for example in the order of a couple of centimeters.

On the other hand, a surface of an object, such as a table or an automobile to which the decorative molding is to be attached is usually flat, or slightly convex. This flat or convex surface makes it impossible or difficult to firmly secure there to a decorative molding which warps toward the outer side of the plastic film, by means of an adhesive or the like. Even if the decorative molding could be adhered to the surface of the object in use, the decorative molding tends to peel off from the surface, at the opposite ends of the molding.

SUMMARY OF THE INVENTION

The primary object of the present invention is, therefore, to provide a method for manufacturing a decorative molding which can eliminate the above mentioned drawback.

Namely, the object of the present invention is to solve the problem of warpage of the products, by providing a decorative molding which has a mounting surface corresponding to a flat or curved surface of an object to which the molding is to be adhered.

In order to achieve the object of the invention, according to the present invention, there is provided a method for manufacturing a decorative molding which has a convex outer surface, comprising preparing a desired shape of a decorative base plate which has an outer decorative layer and a mounting surface made of a plastic layer which shrinks when heated. Pouring thermo-setting liquid plastic onto the outer surface of the decorative layer of the base plate to coat the outer surface with liquid plastic, and then heating the liquid plastic to cure the same and heating the plastic layer of the base plate so that a predetermined amount of shrinkage of the plastic layer takes place, whereby the heat shrinkage of the plastic layer of the base plate cancels the mold shrinkage of the liquid plastic to make the mounting surface of the decorative molding flat or even slightly convex.

BRIEF DESCRIPTION OF THE DRAWINGS

The invention will be described below with reference to the accompanying drawings, in which.

DESCRIPTION OF THE PREFERRED EMBODIMENT

Figure 1:
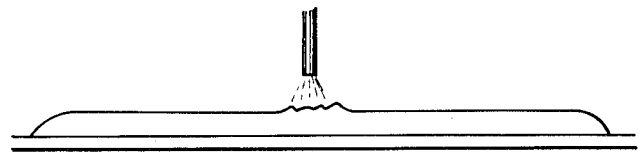
FIG. 1 is a schematic view of a decorative film on to which liquid resin is poured, according to the prior art.
Figure 2:
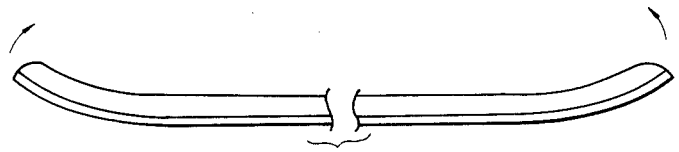
FIG. 2 is a schematic view of a decorative molding which warps at its opposite ends, according to the prior art.
Figure 3:
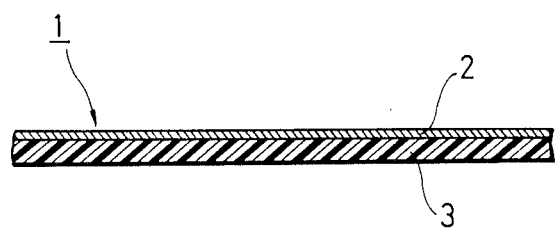
FIG. 3 is a sectional view of a base plate of a decorative molding according to the present invention.

FIG. 3 shows a sectional view of a predetermined shape of base plate 1 for a decorative molding, which plate has an outer decorative layer 2 and a mounting surface made of a plastic layer 3 which shrinks when heated. The decorative layer 2 can be usually made of aluminum foil or other metal foil such as stainless steel, or a decorative material having metalic luster, such as a polyester film on which a metal is evaporated, or the like. Preferably, the decorative layer 2 is made of a material which can scarcely shrink at a temperature below 100° C.

The polyester film of which the decorative layer 3 is made is preferably treated in advance in such a way that it is drawn at a high temperature below the melting point but above the softening point, of polyester resin, and is then heat-set so that almost no shrinkage occurs.

It is also possible to apply desired patterns, letters, or marks or the like, onto the decorative layer 2, by a printing process or hotstamping process, which is press known.

The heat shrinkable plastic layer 3 can be made of soft or semirigid plastic material, such as soft polyvinyl chloride resin or ionomer resin. The plastic layer 3 is, preferably, subjected to a large tensile force when it is molded, so that an excess mold distortion is given thereto. Alternatively, the plastic layer 3 can be slightly drawn in advance, so that a desired amount of shrinkage thereof occurs when it is heated.

The base plate 1 which has the outer decorative layer 2 and the heat shrinkable plastic layer 3 which is rigidly superimposed onto the decorative layer 2 to provide a mounting suface of the decorative molding is preferably made of a sheet material.

The decorative sheet, i.e. the decorative base plate 1 is first sheared or punched to obtain a desired profile, and is then put onto a flat plate (not shown). After that, liquid plastic 4, preferably transparent liquid plastic, such as polyurethane resin, acrylic resin, or epoxy resin, which are all cured by a polymerization, is poured onto the base sheet 1, so that the latter is coated with liquid plastic 4. It should be noted that the liquid plastic has a high consistency, and accordingly the plastic material 4 fed onto the base sheet 1 presents a convex profile on the base sheet due to the interfacial tension thereof, thus resulting in the formation of round peripheral edges of the plastic material.

Figure 4:
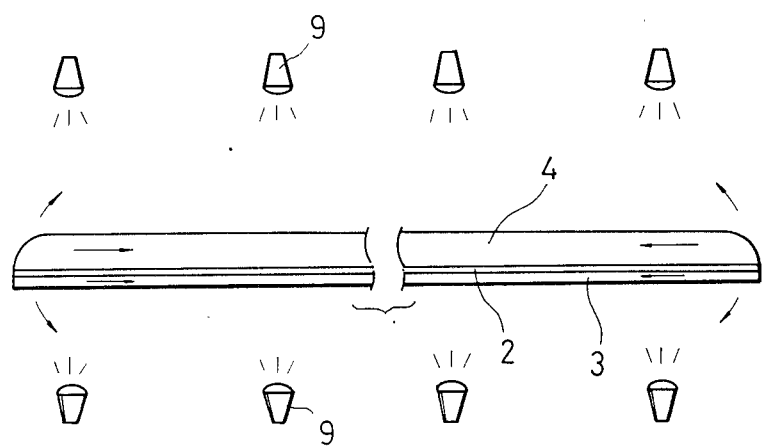
FIG. 4 is a schematic view of a heat shrinkable plastic layer and a resinous material applied thereon which shrinks in the course of the heating process in the method of manufacturing of a decorative molding according to the present invention; and, FIG. 5 is a sectional view of an embodiment of a decorative molding obtained by the present invention.

After that, the liquid plastic 4 is heated at 50° C. to 80° C. by an infrared heater 9 or in a hot air bath to accelerate the polymerization reaction and to cure the same, as shown in FIG. 4. When the plastic is heat-set, the mold shrinkage of the plastic takes place. Due to the shrinkage, the base plate 1 tends to be bent toward the outer surface, i.e. the liquid plastic 4.

However, in the present invention, since the base plate 1 has the heat shrinkable plastic layer 3 which forms the mounting suface and which is also heated together with liquid plastic 4 when the latter is heated and cured, the heat shrinkable plastic layer 3 causes the heat shrinkage thereof simultaneously with the mold shrinkage of the liquid plastic 4. The heat shrinkage of the plastic layer 3 cancels the mold shrinkage of the liquid plastic 4, so that no warpage of the base plate 1 occurs as a whole, as shown at arrows in FIG. 4.

The thickness and coefficient of heat shrinkage, of the heat shrinkable plastic layer 3 which provides the mounting surface of the base plate 1 can be determined in accordance with the kinds of the liquid plastic 4, that is, in accordance with coefficient of mold shrinkage of liquid plastic 4.

Thus, it is possible to make the mounting suface of the heat shrinkable plastic layer 3 flat.

Alternatively, it is also possible to provide even a concave mounting suface of the heat shrinkable plastic layer 3 by properly selecting the thickness or coefficient of heat shrinkage of the liquid plastic, when the surface of the object to which the decorative molding is adhered is convex. Namely, according to the present invention, by the mounting suface, i.e. the bottom suface of the plastic layer 3 can be flat or of any other shape, depending on the shape of the object to which the decorative molding is to be attached.

Furthermore, if the liquid plastic 4 is cured at the normal temperature within a short time, with the help of a catyalitic agent or the like, the heat shrinkable plastic layer 3 can be heated to cause the heat shrinkage thereof, after the curing of the liquid plastic is completed, so that the plastic layer 3 which has been concaved together with the liquid plastic 4 can be returned to its original flat state, or even can be deformed to be convex.

Figure 5:
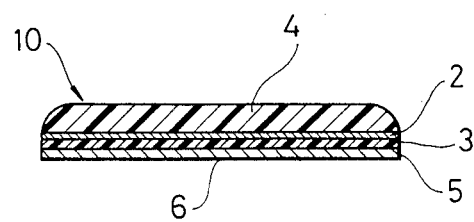

In FIG. 5, the numeral 5 designates the adhesive layer for securing the decorative molding 10 onto the surface of the object to which the decorative molding is to be mounted. The numeral 6 in FIG. 5 designates the protective paper for protecting the surface of the adhesive layer 5. The protective paper can be easily removed, when the decorative molding is adhered to the object.

I claim:

1. A method for manufacturing a decorative molding having an outer surface with a round peripheral edge, comprising:

preparing an elongated shape of a decorative base plate which has an outer decorative layer and a mounting surface made of a plastic layer which shrinks when heated;

pouring thermo-setting liquid plastic onto the outer surface of the decorative layer of the base plate to coat the outer surface of the decorative layer with liquid plastic, and then;

heating the liquid plastic to cure the same, such curing resulting in shrinkage of the plastic coating in the longitudinal direction and a tendency to warp the base plate, and heating the plastic layer of the base plate so that a predetermined amount of shrinkage of the plastic layer in the longitudinal direction takes place to cancel the shrinkage of the coating and make the mounting surface of the base plate flat or slightly convex.

2. A method according to claim 1, wherein said decorative base plate is made of a sheet material.

3. A method according to claim 1, wherein said heat shrinkable plastic layer comprises soft or semirigid plastic of polyvinyl chloride resin or ionomer resin or the equivalent.

4. A method according to claim 1, wherein said heat shrinkable plastic layer is drawn in advance when molded to give a mold shrinkage to the same.

5. A method according to claim 1, wherein the thermo-setting liquid plastic is transparent.

6. A method according to claim 1, wherein said plastic layer of the base plate is heated to cause a heat shrinkage of the plastic layer so that the mounting surface of the base plate is flat.

7. A method according to claim 1, wherein said plastic layer of the base plate is heated to cause the heat shrinkage thereof, so that the mounting surface of the base plate is convex in such a way that the mounting surface is curved to project toward the outer surface of the base plate.

8. A method according to claim 1, wherein the heating of the liquid plastic layer and the heating of the plastic layer of the base plate are performed simultaneously.

* * * * *